April 13, 1948.   J. D. WALKER   2,439,764
WATER TREATING APPARATUS
Filed May 8, 1943   2 Sheets-Sheet 2
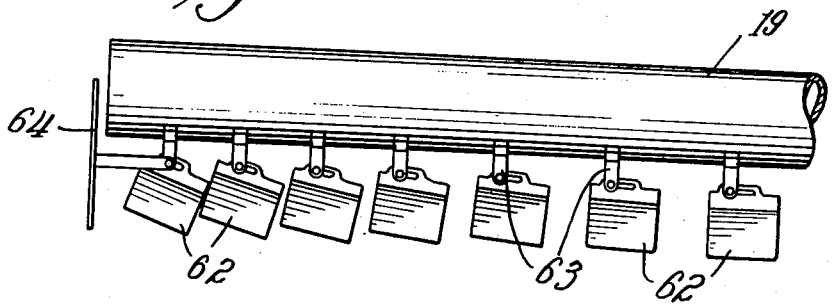
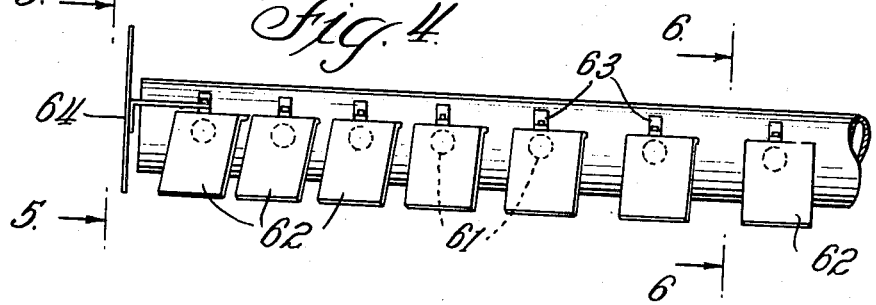
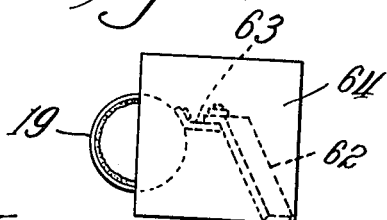
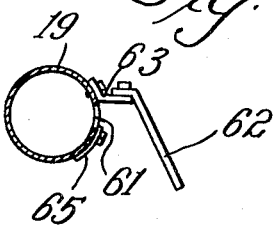
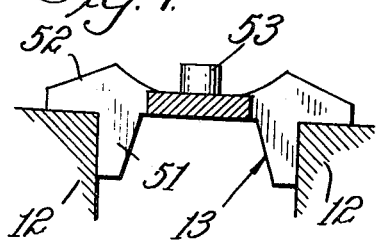
Inventor:
James D. Walker
By Mann, Brown &c.
Attys.

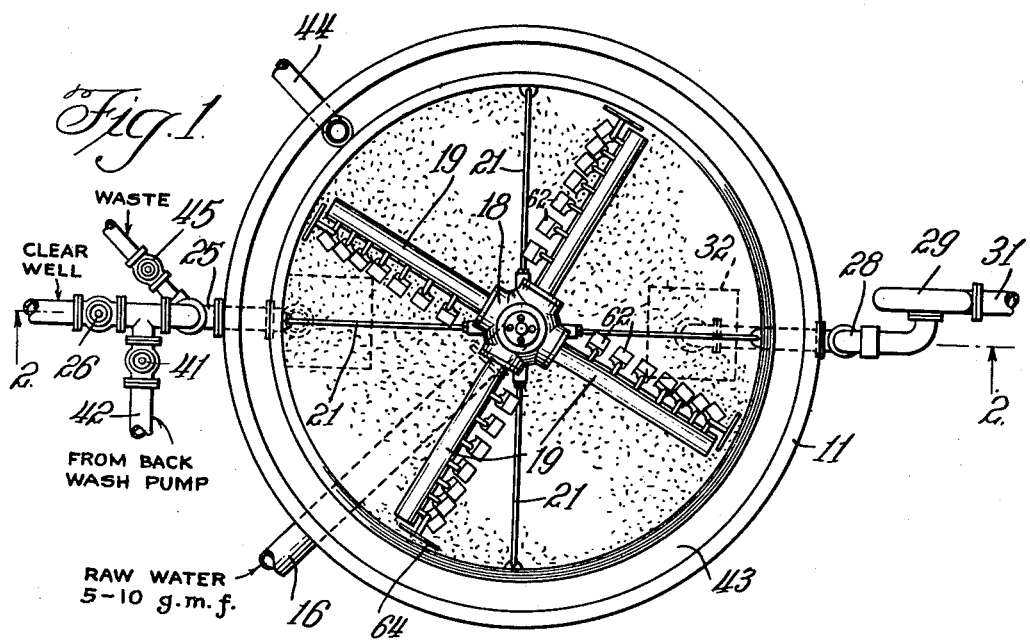
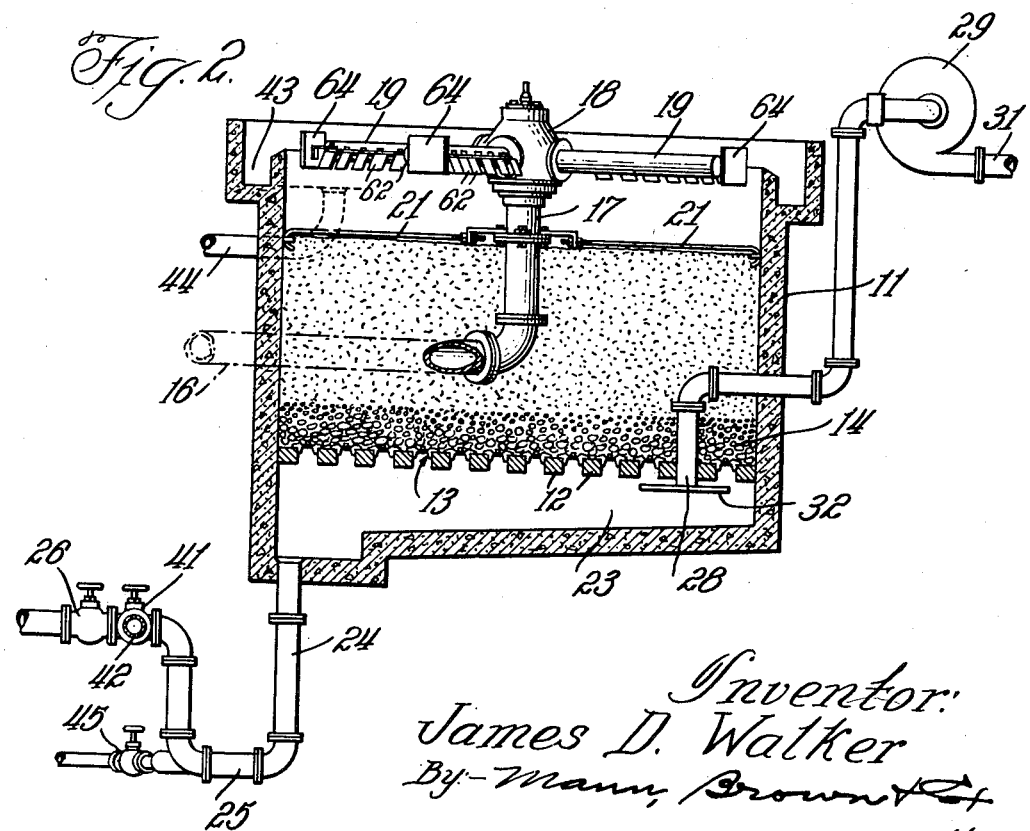

Patented Apr. 13, 1948

2,439,764

UNITED STATES PATENT OFFICE 2,439,764

WATER TREATING APPARATUS

James D. Walker, Aurora, Ill., assignor to The American Well Works, a corporation of Illinois Application May 8, 1943, Serial No. 486,172

4 Claims. (Cl. 210—16)

A good many municipal water supplies have in the past contained an undesirably high percentage of iron or carbon dioxide or both, because the cost of removing such substances, especially iron, has been relatively high.

The presence of iron in water supplies is a common occurrence and is objectionable to most consumers when it is present even in small quantities. Iron may impart a disagreeable taste, odor or cloudy appearance to the water and causes unsightly staining of plumbing fixtures. Bacteria existing in water supplies containing iron are extremely objectionable. The most common of these is Crenothrix which feeds upon iron and later precipitates it as iron oxide. Serious clogging difficulties result from multiplication of these organisms as well as unpleasant tastes and odors resulting from their death and subsequent decay.

With iron, it is not uncommon to find manganese present and its undesirable qualities act similarly and are as objectionable as those of iron.

Iron in water is usually accompanied by carbon dioxide which exists in the form of carbonic acid and is responsible for dissolving the iron from the ground. The release of free carbon dioxide from water is of great importance in the prevention of corrosion. Also, free carbon dioxide probably must be released, at least temporarily, before the iron and manganese can be oxidized and precipitated.

Iron and manganese are removed by two principal methods. One is aeration (generally contact aeration) followed by filtration of the precipitated hydrate. This method is used for the removal of bicarbonate-bound iron and manganese. The other method is lime and soda ash softening for the removal of sulphate-bound iron. Bicarbonate forms are the most common and sulphate forms are rarely encountered.

The invention relates to the removal of bicarbonate forms of iron and manganese. It effectively, economically and completely removes iron and manganese and accompanying carbon dioxide from the water supply. The unit supplants the expensive coke tray aerator and sand filter combination since the functions of both are carried out in the apparatus of this invention. Furthermore, this apparatus is more efficient than each of the others for the function performed thereby; and, by occasional backwashing, retains its efficiency indefinitely. The carbon dioxide can be removed more completely than has previously been possible with comparable apparatus. The invention can be used for removal of carbon dioxide even if no minerals are present.

One of the important factors in obtaining the excellent results of this invention is the combination of a rotary distributor with filter bed of relatively fine light-weight particles and backwash facilities so that the bed can be kept quite clean in spite of the fact that the smallness of its particles provide rather small interstitial spaces (as well as providing tremendous total surface area compared to their volume). Because of the open interstices and the large surface areas and because of the uniform distribution of water obtainable by the rotary distributor, the water can be treated at unheard of flow rates per square foot.

Additional advantages and objects of the invention will be apparent from the following description and from the drawings, in which:

Fig. 1 is a plan view of the apparatus chosen for illustration of the invention.

Fig. 2 is a vertical, sectional view of the structure shown in Fig. 1, being taken approximately on the line 2—2 of Fig. 1.

Figs. 3 to 6 show details of one form of the distributor arms.

Fig. 7 is a fragmentary detail view showing particularly one of the drain members in place.

A preferred form of the invention has been chosen for illustration and description, in compliance with Section 4888 of the Revised Statutes, but persons skilled in the art will readily perceive other means utilizing the inventive concepts for accomplishing the same results.

A tank 11 is provided with a suitable false bottom. In the preferred form, the false bottom comprises beams 12 extending across the tank and supported at suitable mid-points if necessary, and drain gratings 13. The beams may be precast concrete or channel members. The drain gratings were illustrated more completely in my copending application Serial No. 435,472, filed March 20, 1942, now Patent Number 2,387,101, Oct. 16, 1945 the disclosure of which is hereby made a part of this application by reference. However, the cross ribs are preferably closer together than in said application. The filter bed 14 comprises coarse filter material resting on the channel members 12 and gratings 13 and successively finer filter material thereabove. For example, four inches may be one to two inch stone; the succeeding four inches, one-half to one inch stone; and the next, one-fourth to one-half inch stone.

Above the stone is positioned a bed 14 comprising the main working medium, which may be any filter medium having the qualities of removing the substances, the removal of which is desired. For removing iron and carbon dioxide, a carefully washed and graded coal is at present preferred, anthracite having the advantage of greater resistance to gradual disintegration. The particle size may be at least as small as one and one-half to two millimeters, although a slightly larger size is at present preferred.

The choice of size and necessary depth of bed will depend on the nature of the water to be treated. The following is recommended:

| Iron Content (Carbonate) | Media Depth |
|---|---|
| P. p. m. | Feet |
| 1 | 4 |
| 2 | 5 |
| 4 | 6 |
| 8 | 7 |
| 12 | 8 |
| 18 | 9 |
| 24 | 10 |

The size preferred in at least the first three items above is $\frac{3}{32}$ to $\frac{7}{16}$ inch. In the last few items, the size preferred is $\frac{1}{16}$ to $\frac{1}{8}$ inch, although it may be preferred to increase the depth somewhat beyond that indicated so as to give an equivalent total surface area of the particles. The larger size means less frequent backwashing since the interstices are larger and hence will not fill up as rapidly. In any event, the above table is figured on average conditions and might be varied according to whether the foreign matter is hard or easy to remove.

Coal is preferred because its light weight permits larger particle sizes and larger interstices.

Another advantage of coal is that the smooth impervious surface permits the removal by backwash of substantially all deposits therefrom so that there is no permanent incrustation or enlargement. However, unless all of these advantages are required, other media such as crushed glass, stone or sand can be used.

After filling the filter, the fines should be removed as otherwise they will work to the top and, because of their smaller interstices, cut down the capacity of the bed. They can be removed by backwashing the bed several times as described below and removing the top inch of media after each backwashing. For four such removals, an extra four inches of media should be supplied.

Water to be treated is fed through an influent pipe 16 and a vertical or center column pipe 17 to a rotary drum or head 18 carrying distributor arms 19. The rotary distributor comprising the head 18 and arms 19 may be rotated by the reaction of the water pressure as the water is sprayed out of the orifices. Of course, it could be motor driven, if desired. The pipe 17 may be supported in any suitable manner, as by pipe 16 and stays 21. In larger sizes, a center column extending to the bottom of the tank would be used.

The rotary arms 19 are positioned the correct distance above the bed 14 to ensure the supply of just the correct amount of oxygen to the water, the height being varied to suit the conditions. It has been found that usually the proper height lies between two and three feet. The water is sprayed evenly in a thin film across the surface of the bed 14 and trickles freely through the bed and through the drain gratings 13 to the bottom chamber 23 of the tank. Even distribution may be obtained by spacing the outlets closer together as the distance from the center increases, or by varying the orifice size, or both. From chamber 23, water may run through the pipe 24, trap 25 and valve 26 to the clear well or other water storage tank, the capacity of which preferably amounts to at least sixty minutes of flow.

When both carbon dioxide and iron are to be removed or when carbon dioxide is to be removed without iron, it is desirable to have a constant flow of air through the bed 14. Although the air can be made to flow either upwardly or downwardly, it is preferred to have it flow downwardly so that there will be no danger that the filter bed will be air-locked with the resultant cessation of the flow of water downwardly therethrough. Theoretically the air can be made to flow downwardly through the filter either by applying suction at the bottom of the filter, or by applying pressure at the top of the filter. The suction method is preferred because of simplicity and because it lowers the pressure somewhat throughout the filter bed, particularly the lower portion thereof, and hence tends to draw the carbon dioxide out of the water so that the water flowing from the filter has an exceptionally low carbon dioxide content.

Air is drawn from the chamber 23 through pipes 28 by a suction fan 29 which may discharge through a pipe 31 to the outside atmosphere to avoid corrosive effects of the air drawn from the filter. A baffle plate 32 may be provided around the end of the pipe 28 or any other means may be used for preventing water from being drawn into the pipe 28, though probably none will be necessary.

At the present time, it is desired to use a suction equal to 36 to 48 inches of water. Accordingly, the trap 25 should be four feet deep and its outlet should be at least four feet below the lower portion of chamber 23.

For less efficient use of the invention blower 29 can be omitted, in which case some circulation of air will be forced by the pulsating action of the sheets of water from the rotary distributor. Measurements in one installation have indicated that the flow of air out through the pipe 28 without a blower is about only one-tenth of that provided with the blower 29. The carbon dioxide content of the effluent water would have been objectionable for some purposes, although it was much lower than would have been possible without the circulation of air provided by the rotary distributor action together with the outlet 28 communicating below the false bottom.

The filter bed may be regenerated or rejuvenated by a brief backwashing. This is accomplished by opening a valve 41 and closing valve 26. The valve 41 connects a pipe 42 from the wash water pump or other suitable source of supply to the pipe 24. Thus, wash water is supplied to the chamber 23 and flows upwardly through the filter bed. At the top of the tank it overflows into an annular trough 43, from which it may flow out through a connection 44 to waste. When the backwash is completed, a valve may be opened to drain the tank to waste. Diagrammatically the valve 45 is shown for this purpose and also for draining trap 25, although a separate larger pipe beyond the trap might be used for tank drainage and if necessary, for operating the system after backwashing until turbidity was minimized before turning the water into the clear well.

A backwash of approximately one minute is sufficient to wash the media free of coagulated iron. The flow through the filter is so uniform that this short period and a low backwash pressure have been found adequate. In any event the backwash should be continued until clear spots appear in the water above the bed.

The gratings 13 include projections or legs 51 which coact with the channel beams 12 to position the gratings 13 in a bridging position. The gratings are also provided with upstanding wings 52 and knobs 53 for holding the media thereabove in a position which will permit free flow of water through the gratings. The spaces between wings 52 are not over one inch wide.

Surprising quantities of water can be treated with this apparatus, especially surprising by comparison with sewage treatment in trickling filters, but also surprising as compared to the prior practice in sprinkling decarbonizing trays. In sewage treatment, the dosing or sprinkling of each spot on the surface of the bed has occurred at about 10 second intervals. The average rate of flow through the distributor has been less than one-tenth of a gallon per minute per square foot of the surface area of the bed. For example, the apparatus of the Jenks Patent No. 2,168,208, is a high flow-rate apparatus by past standards, but it is believed that no prior art apparatus has ever reached a flow rate in commercial practice, even with recirculation, much above .3 gallon per minute per square foot. The apparatus of this invention on the other hand can handle at least ten gallons per minute per square foot and in fact, the invention is not being efficiently utilized unless the rate of flow is at least six gallons per minute per square foot or somewhat lower in case of difficult removal. This can also be compared with two gallons per minute per square foot recommended for coke trays before applicant's invention. The dosing interval may be as frequent as every 1½ to 3 seconds, the distributor with four or six arms rotating at a rate of five to six revolutions per minute.

One reason why this apparatus is able to handle the water at such an unheard of rate is that the bed particles are relatively small in size and hence have a very large surface area while at the same time clogging of the interstices is completely avoided by the occasional backwash. It is believed that the rotary distributor has never before been used either with the effective backwash which is accomplished by expanding the bed as the water flows upwardly therein or with the relatively fine size coal particles which are desirable not only because of their filtering characteristics but also because their light weight facilitates the expansion of the bed and their surface characteristics facilitates the removal of deposits therefrom.

Of course this new combination of a rotary distributor and an expanding bed backwash can be used for other purposes with corresponding gains in treatment speed. For example, it can be used for treating the supernatant from an anaerobic digester so as to render it harmless to return to the main sewage treatment system. It can also be used for treating sewage and organic wastes. In all of these instances, recirculation will probably be used. For example, fresh sewage or organic wastes can be handled at a rate of one-half to two gallons per minute per square foot, which is much faster than has previously been possible, and it will be recirculated at such a rate that the total flow through the distributors will be from six to ten gallons per minute per square foot. For some of these purposes, it may be desirable to use less air suction or even none, though preferably with pipe 28 aiding the flow of air, and in some instances, at least if the particles are larger than the smaller sizes here contemplated, a slight air pressure may be desirable. So that the interstices will not fill up too rapidly, a particle size at least as large as $\frac{1}{16}$ inch to $\frac{1}{8}$ inch is contemplated for sewage.

It should be noted that in backwashing the bed after treating sewage or industrial waste, the excess sewage or flocs which would tend to clog up the interstices would be washed out quite easily after expansion of the bed by the back flow, although the particles will retain traces of bacterial slimes which in effect seed the bed to render it ideal for the start of further treatment.

Of course in handling the large volumes of water or liquor in accordance with this invention, it is important to obtain a very uniform distribution of it over the area of the bed. The apparatus shown in Figs. 3 to 6 is very satisfactory for this purpose. The distributor arms 19 are provided with a plurality of orifices 61, one of which is seen in Fig. 6. In front of each of these orifices is located a spreader plate 62 which is adjustably carried by bracket 63. These spreader plates may all extend downwardly at the same angle, but are adjustable to direct the water more or less inwardly. It is desirable to direct it inwardly partly to overcome the centrifugal force thereof and to keep it from being thrown against the outer wall of the tank. Not only would that result in an excessive portion of the water falling at the extreme outside edge of the tank, but that which runs down the wall is not properly treated. As a further safeguard against throwing the water onto the wall, an extra splash plate 64 may be positioned at the end of each arm as illustrated.

By the spacing of the orifices 61 or by varying their effective size by adjustable cover plates 65, or both, and by variations in the positioning of the spreader plates 62, the distribution of the water or liquid across the area of the bed can be made quite uniform. Of course the spreader plate also serves to spread the water in thin sheets so that it is aerated as it falls. It will be observed that with the spreader plates positioned approximately as shown, these various thin sheets will overlap one another. It should also be pointed out that the orifices 61 are much closer together than is conventional, and closer than has been illustrated. For example, 1½ inch orifices would probably be spaced on 4" centers. It is preferred at present to have all the orifices spaced this close and rely on the cover plates 65 for even distribution.

It should be noted that an important aid in obtaining the high rates of treatment made possible by this invention is the use of the rotary distributor which permits a high degree of uniformity of loading of the various portions of the area of the bed. Pan tests can be made and the splash plates 62 adjusted to obtain uniformity in filling the pans at different distances from the center. Without the uniformity, any attempt to crowd close to the treatment rates that are possible with the uniformity will inevitably result in overloading some portions of the filter while other portions are not working at capacity.

The importance of avoiding over-aeration in iron removal should not be overlooked. Surprisingly, excessive aeration results in the precipitation of colloidal iron which is so fine that it passes through the filter and would even pass through a slow sand filter. With the rotary distributor arms about three feet above the bed and with the splash plates which produce sheets rather than fine spray, no trouble has been encountered with over-aeration. It has been considered desirable, however, to provide a separable piece in the vertical pipe 17 which, in the event of over-aeration, could be removed to lower the rotary distributor.

It is preferred that the spreader plates 62 be positioned on top of the brackets 63 as seen in Figs. 5 and 6 so as to leave an unobstructed path for the flow of water from each orifice 61 to the spreader plate.

Although flow rates of at least 5 or 6 gallons per minute per square foot are preferred, any flow rate maintained over 2 gallons per minute per square foot will constitute a decided improvement over past practice, even if it does not use the full efficiency provided by this invention.

By full use of the invention, water can be treated several times as fast as before, and the entire treatment takes place in a single bed, leaving the water unusually free of both iron and carbon dioxide; and also of organic turbidity in case any should be present in the raw water.

I claim:

1. Water treating apparatus including a tank, a false bottom in the tank comprising spaced parallel beams, grating members resting on the beams having projections extending between the beams and adjacent thereto to position the grating members in bridging position and having projections extending upwardly to prevent clogging of the grating by overlying material, coarse material resting on the grating, a bed of anthracite coal of a particle size mainly of the order of at least 1½ millimeters supported thereby, a rotary distributor for sprinkling water in a thin layer on the surface of the bed, said distributor being spaced approximately between two and three feet above the bed, means for supplying raw water to the rotary distributor, means for draining the water from the tank below the false bottom, means alternatively effective for supplying backwash water to the tank below the false bottom and causing it to flow upwardly through the bed, and an overflow trough adapted to receive water overflowing from the tank and to discharge it to waste.

2. The method of removing carbon dioxide and iron from water which consists in applying the water approximately uniformly at a rate equal to at least six gallons per minute per square foot to the surface of a filter bed composed of particles of substantially clean coal not over approximately five-sixteenths of an inch in size allowing the water to trickle freely through the filter and flowing air through the filter bed, in excess of that which would be pushed through by water alone.

3. The method of removing carbon dioxide and iron from water which consists in applying the water approximately uniformly at a rate equal to at least six gallons per minute per square foot to the surface of a filter bed composed of particles of substantially clean coal not over approximately five-sixteenths of an inch in size and flowing air through the filter bed, in excess of that which would be pushed through by water alone, and subjecting the water approximately at the end of the treatment to a sub-atmospheric pressure.

4. Filter apparatus including a tank, a false bottom in the tank comprising spaced parallel beams, grating members resting on the beams having projections extending between the beams and adjacent thereto to position the grating member in bridging position, and having projections extending upwardly to prevent clogging of the grating by overlying material, coarse material resting on the grating, a filter bed supported thereby, means for supplying raw liquor in such manner that it passes through the filter and grating, and means for thereafter draining the liquor from the tank.

JAMES D. WALKER.

REFERENCES CITED

The following references are of record in the file of this patent:

UNITED STATES PATENTS

| Number | Name | Date |
|---|---|---|
| 528,630 | Freise | Nov. 6, 1894 |
| 644,137 | Jewell | Feb. 27, 1900 |
| 1,056,800 | Krause | Mar. 25, 1913 |
| 1,358,840 | Gammage | Nov. 16, 1920 |
| 1,698,079 | Wagner | Jan. 8, 1929 |
| 1,933,567 | Rodman | Nov. 7, 1933 |
| 1,985,435 | Watson | Dec. 25, 1934 |
| 1,992,420 | Gleason et al. | Feb. 26, 1935 |
| 2,047,687 | Infield | July 14, 1936 |
| 2,057,237 | Hoop | Oct. 13, 1936 |
| 2,073,441 | Blunk | Mar. 9, 1937 |
| 2,115,188 | Atkinson et al. | Apr. 26, 1938 |
| 2,141,979 | Halvorson et al. | Dec. 27, 1938 |
| 2,168,208 | Jenks | Aug. 1, 1939 |
| 2,189,513 | Bolton | Feb. 6, 1940 |
| 2,200,580 | Pruss et al. | May 14, 1940 |
| 2,237,882 | Lawlor et al. | Apr. 18, 1941 |
| 2,308,866 | Dekema | Jan. 19, 1943 |
| 2,309,916 | Palmer | Feb. 2, 1943 |
| 2,317,782 | Levine | Apr. 27, 1943 |
| 2,352,901 | Klein | July 4, 1944 |

FOREIGN PATENTS

| Number | Country | Date |
|---|---|---|
| 8,671 | Great Britain | 1894 |
| 16,050 | Great Britain | July 11, 1913 |
| 25,480 | Great Britain | 1903 |
| 25,682 | Great Britain | Nov. 4, 1910 |
| 237,602 | Germany | Aug. 22, 1911 |
| 523,991 | Germany | May 7, 1931 |